US008934344B2

United States Patent
Memon et al.

(10) Patent No.: US 8,934,344 B2
(45) Date of Patent: Jan. 13, 2015

(54) PACKET SWITCHING

(71) Applicant: Intel Corporation, Santa Clara, CA (US)

(72) Inventors: Mazhar I. Memon, Beaverton, OR (US); Steven R. King, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/167,533

(22) Filed: Jan. 29, 2014

(65) Prior Publication Data

US 2014/0146675 A1    May 29, 2014

Related U.S. Application Data (63) Continuation of application No. 13/222,756, filed on Aug. 31, 2011, now Pat. No. 8,675,491, which is a continuation of application No. 12/145,236, filed on Jun. 24, 2008, now Pat. No. 8,031,606.

(51) Int. Cl.
*G01R 31/06* (2006.01)
*G06F 11/00* (2006.01)
*G08C 15/00* (2006.01)
(Continued)

(52) U.S. Cl.
CPC ............ *H04L 47/6255* (2013.01); *H04L 47/10* (2013.01); *H04L 47/2433* (2013.01); *H04L 47/2483* (2013.01); *H04L 47/32* (2013.01); *H04L 49/109* (2013.01); *H04L 47/2475* (2013.01); *H04L 47/627* (2013.01)
USPC .......... 370/235; 370/252; 370/359; 370/412; 370/419

(58) Field of Classification Search
USPC ................ 370/235, 252, 352, 359, 412, 419; 710/29, 39; 718/100
See application file for complete search history.

(56) References Cited

U.S. PATENT DOCUMENTS 5,412,651 A    5/1995   Gorshe
5,448,567 A    9/1995   Dighe et al.
(Continued)

OTHER PUBLICATIONS

Netscaler Editions: "Citrix, Flexibility Meeting Different Web Application Delivery Needs", Retrieved on Jun. 24, 2008, 3 pages. Available at: http://www.citrix.com/English/ps2/products/feature.asp?contentID=21681, 3 Pages.
(Continued)

*Primary Examiner* — Benjamin H Elliot, IV
(74) *Attorney, Agent, or Firm* — Christopher K. Gagne (57) ABSTRACT

In an embodiment, an apparatus is provided that may include an integrated circuit including switch circuitry to determine, at least in part, an action to be executed involving a packet. This determination may be based, at least in part, upon flow information determined, at least in part, from the packet, and packet processing policy information. The circuitry may examine the policy information to determine whether a previously-established packet processing policy has been established that corresponds, at least in part, to the flow information. If the circuitry determines, at least in part, that the policy has not been established and the packet is a first packet in a flow corresponding at least in part to the flow information, the switch circuitry may request that at least one switch control program module establish, at least in part, a new packet processing policy corresponding, at least in part, to the flow information.

18 Claims, 5 Drawing Sheets

(51) Int. Cl.
*H04J 1/16* (2006.01)
*H04J 3/14* (2006.01)
*H04L 1/00* (2006.01)
*H04L 12/26* (2006.01)
*H04L 12/863* (2013.01)
*H04L 12/801* (2013.01)
*H04L 12/851* (2013.01)
*H04L 12/823* (2013.01)
*H04L 12/933* (2013.01)
*H04L 12/859* (2013.01)

(56) References Cited

U.S. PATENT DOCUMENTS

| | | | |
|---|---|---|---|
| 6,154,776 | A | 11/2000 | Martin |
| 6,426,943 | B1 | 7/2002 | Spinney et al. |
| 6,980,555 | B2 | 12/2005 | Mar |
| 7,251,242 | B2 | 7/2007 | Schrodi |
| 7,508,764 | B2 | 3/2009 | Back et al. |
| 7,719,982 | B2 | 5/2010 | Varma |
| 8,031,606 | B2 | 10/2011 | Memon et al. |
| 8,675,491 | B2 * | 3/2014 | Memon et al. ............... 370/235 |
| 2003/0067874 | A1 | 4/2003 | See et al. |
| 2004/0260829 | A1 | 12/2004 | Husak et al. |
| 2006/0136987 | A1 | 6/2006 | Okuda |
| 2007/0104200 | A1 | 5/2007 | Lai |
| 2008/0148341 | A1 | 6/2008 | Ferguson et al. |
| 2008/0189769 | A1 | 8/2008 | Casado et al. |
| 2008/0310307 | A1 | 12/2008 | Yeom |
| 2008/0316922 | A1 | 12/2008 | Riddle et al. |
| 2009/0316711 | A1 | 12/2009 | Memon et al. |
| 2011/0310909 | A1 | 12/2011 | Memon et al. |
| 2014/0146675 | A1 * | 5/2014 | Memon et al. ............... 370/235 |

OTHER PUBLICATIONS

Cisco, Technology Overview: "Make your network efficient, reliable, and secure", Retrieved on Jun. 24, 2008, 1 page. Available at: http://www.cisco.com/en/US/products/hw/switches/products.sub.--categoty.s- ub.--technologies.sub.-- overview.html.

"The Power of End-to-End Virtualization", Citrix, Providing Unprecedented Agility & Improved Server Performance for IT, Retreieved on Jun. 24, 2008, 2 pages. Available at: http://citrix.com/English/ps2/products/feature.asp?contentID=1297845.

"VMware Infrastructure 3 Online Library", vmware, Virtual Switches, Retrieved on Jun. 24, 2008, 3 pages. Available at: http://pubs.vmware.com/vi3/serverconfig/sc.sub.--networking.5.4.html.

Mullins, Robert, "Sun Niagara 2: The eight-core sequel", InfoWorld, IDG News Service, Aug. 6, 2007, pp. 1-2. Available at: http://www.infoworld.com/archives/emailPrint.jsp? . . . /08/06/Sun-Niagara-2-the-eight-core-sequel. sub.--1.html.

Newman, David, "Cisco's virtual switch smashes throughput records", Network World Lab Alliance, Online Reprint, Jan. 3, 2008, pp. 1-4.

Wolf, Chris, "Virtual Switch Security: VMware, Virtual Server and XenExpress", Virtualization Platforms, Feb. 20, 2007, 4 pages. Available at: http://searchservervirtualization.techtarget.com/tip/0,289483,sid94.sub.-- -gci1244407,00.html.

Final Office Action received for U.S. Appl. No. 12/145,236, mailed on Jul. 22, 2010, 12 pages.

Non-Final Office Action received for U.S. Appl. No. 12/145,236, mailed on Jan. 21, 2011, 12 pages.

Non-Final Office Action received for U.S. Appl. No. 12/145,236, mailed on Mar. 1, 2010, 12 pages.

Notice of Allowance received for U.S. Appl. No. 12/145,236, mailed on Jun. 9, 2011, 9 pages.

Request for Continued Examination and Response to Final Office Action received for U.S. Appl. No. 12/145,236, filed Sep. 15, 2010, 14 pages.

Response to Non-Final Office Action filed for U.S. Appl. No. 12/145,236, filed Mar. 24, 2011, 12 pages.

Response to Non-Final Office Action filed for U.S. Appl. No. 12/145,236, filed May 5, 2010, 11 pages.

Notice of Allowance received for U.S. Appl. No. 13/222,756, mailed on Nov. 8, 2013, 12 pages.

Non-Final Office Action received for U.S. Appl. No. 13/222,756, mailed on Mar. 22, 2013, 17 pages.

Final Office Action received for U.S. Appl. No. 13/222,756, mailed on Jun. 7, 2013, 15 pages.

Response to Final Office Action filed for U.S. Appl. No. 13/222,756, filed Jul. 26, 2013.

Response to Non-Final Office Action filed for U.S. Appl. No. 13/222,756, filed May 24, 2013, 11 pages.

* cited by examiner

PACKET SWITCHING

CROSS-REFERENCE TO RELATED APPLICATIONS

This application is a continuation of prior co-pending U.S. patent application Ser. No. 13/222,756, filed Aug. 31, 2011, which is a continuation of U.S. patent application Ser. No. 12/145,236, filed Jun. 24, 2008.

FIELD

This disclosure relates to packet switching.

BACKGROUND

One conventional virtualized platform includes a physical network interface that includes physical ports that are shared among multiple virtual machines implemented by the platform via a software switching mechanism executed by the host processor in the platform. The software switching mechanism implements all of the switching-related functions in the platform that facilitate and control sharing of the ports among the virtual machines.

Unfortunately, implementing all of these switching-related functions in software executed by the host processor results in an undesirably large amount of host processor computation bandwidth being consumed, undesirably high amounts of actuating power being consumed by the host processor, and undesirably large amounts of heat being generated by the host processor. It also results in an undesirably large amount of latency in data transfers between the ports and the virtual machines, as a result, at least in part, of an intermediate transfer of the data to or from one or more queues associated with software mechanism.

In another conventional virtualized platform, all of these switching-related functions are implemented by a hardware switch. Unfortunately, in order to implement all of these switching-related functions in hardware, undesirably large hardware content addressable memories and side random access memories typically are required; this consumes an undesirably large amount of integrated circuit "real estate." Also, disadvantageously, the forwarding algorithms and/or policies implemented by such hardware switches typically are hard-coded and cannot be easily updated, modified, or changed.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
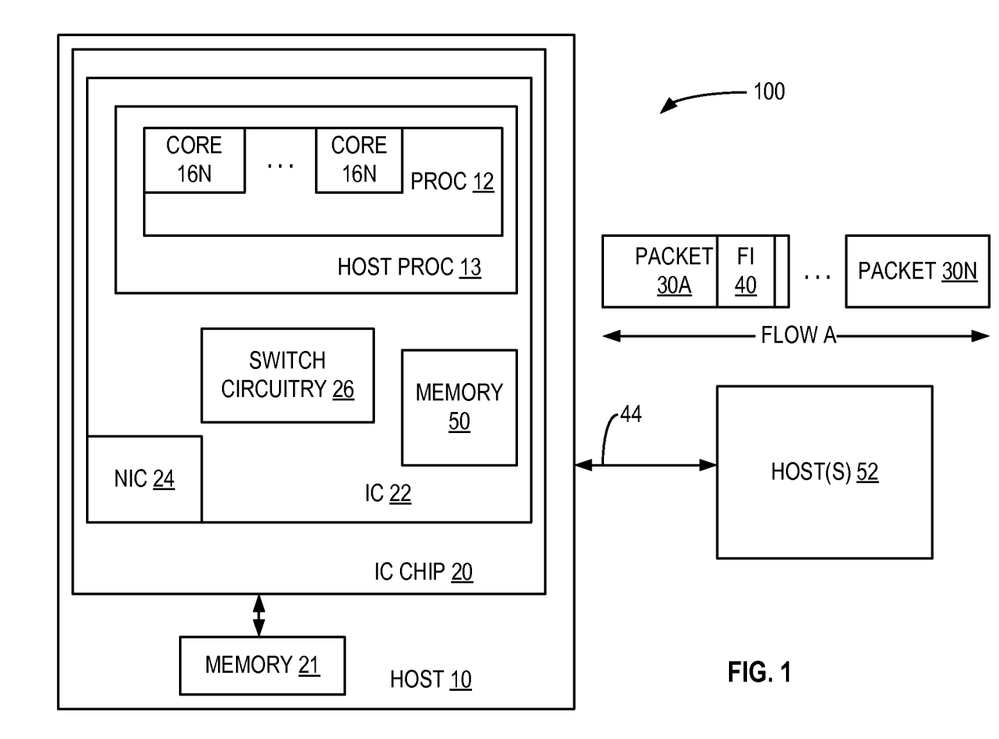
FIG. 1 illustrates a system embodiment.

FIG. 1 illustrates a system embodiment 100. System 100 includes host 10 that is communicatively coupled to one or more other hosts 52 via one or more communication links 44.

In system 100, host 10 comprises integrated circuit (IC) chip 20 that is communicatively coupled to machine-readable memory 21. IC chip 20 comprises IC 22. IC 22 includes network interface controller 24, switch circuitry 26, one or more host processors 13, and machine-readable memory 50. In this embodiment, one or more host processors 13 may comprise one or more processors 12. One or more processors 12 may comprise one or more (and in this embodiment, a plurality of) processor cores 16A . . . 16N.

One or more hosts 52 may have the same construction and/or operation as the construction and/or operation of host 10. Alternatively, without departing from this embodiment, one or more hosts 52 may have different respective constructions and/or operations, in whole or in part, from the construction and/or operation of host 10.

As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry. Additionally, as used herein, first device may be "communicatively coupled" to a second device if the first device is capable of transmitting to and/or receiving from the second device one or more signals. "Memory" may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writeable memory. As used herein, an "integrated circuit" means a semiconductor device and/or microelectronic device, such as, for example, may be comprised within a semiconductor integrated circuit chip, such as, in this embodiment, chip 20.

One or more links 44 may permit the exchange data and/or commands between host 10 and one or more hosts 52 in accordance with, e.g., an Ethernet protocol and/or Transmission Control Protocol/Internet Protocol (TCP/IP) protocol. The Ethernet protocol utilized in system 100 may comply or be compatible with the protocol described in Institute of Electrical and Electronics Engineers, Inc. (IEEE) Std. 802.3, 2000 Edition, published on Oct. 20, 2000. Alternatively or additionally, the TCP/IP protocol utilized in system 100 may comply or be compatible with the protocols described in Internet Engineering Task Force (IETF) Request For Comments (RFC) 791 and 793, published September 1981. Of course, many different communication protocols may be used for such data and/or command exchange without departing from this embodiment.

Figure 2:
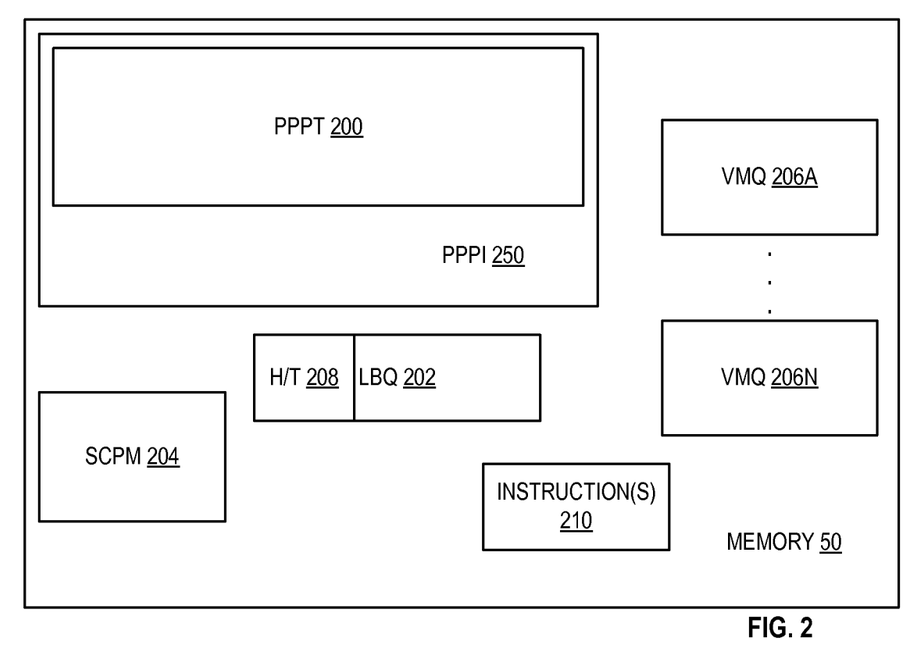
FIG. 2 illustrates data structures in an embodiment.

Machine-readable program instructions and/or related data may be stored in computer-readable memory 50, 21, and/or other computer-readable memory (not shown) that may be comprised in integrated circuit 22, chip 20, and/or host 10. For example, as is shown in FIG. 2, memory 50 may contain or comprise one or more such instructions 210. In operation of host 10, these instructions and/or related data (such as, for example, data comprised in packet processing policy information (PPPI) 250 and/or packet processing policy table (PPPT) 200 shown in FIG. 2) may be accessed and executed by IC 22, chip 20, NIC 24, switch circuitry 26, one or more host processors 13, one or more processors 12, and/or one or more processor cores 16A . . . 16N, and when so accessed and executed, may result in the host 10, IC 22, chip 20, NIC 24, switch circuitry 26, one or more host processors 13, one or more processors 12, and/or one or more processor cores 16A . . . 16N and/or other components of system 100, performing the operations described herein as being performed by host 10, IC 22, chip 20, NIC 24, switch circuitry 26, one or more host processors 13, one or more processors 12, and/or one or more processor cores 16A . . .16N and/or these other components of system 100.

Although not shown in the Figures, IC 22 may comprise an input/output hub (IOH) and/or memory controller hub (MCH). The IOH may comprise and/or provide communicative coupling between NIC 24 and switch circuitry 26, and may be communicatively coupled to the MCH. The MCH may permit the memory 50 and/or memory 21 to be communicatively coupled to the IOH and/or one or more host processors 13. In this embodiment, IC 22 may comprise programmable reconfigurable logic circuitry included in, for example, switch circuitry 26.

With reference now being made to FIGS. 1 to 4, operations 400 (see FIG. 4) that may be performed in system 100 according to an embodiment will be described. After, for example, a reset of system 100 and/or host 10, one or more host processors 13, one or more processors 12, and/or one or more processor cores . 16A . . . 16N may execute one or more operating system (OS) and/or virtual machine monitor (VMM) processes (not shown) that may result in host 10 appearing to constitute (for example, from the vantage point of a not shown human user, and/or other processes executed and/or resources comprised in host 10) a plurality of not shown virtual machines (VM). The OS and/or VMM processes may associate with each VM one or more respective VM queues 206A . . . 206N in memory 50. As described herein, VM queues 206A . . . 206N may provide a mechanism via which one or more flows (e.g., flow A and/or flow B) of packets (e.g., packets 30A . . . 30N and/or 32A . . . 32N, respectively) received by NIC 24 from one or more hosts 52 via one or more links 44 may be provided to and/or presented with one or more VM in accordance with, at least in part, one or more packet processing policies established in host 10. As used herein, a "packet" comprises one or more symbols and/or values. In this embodiment, a "flow" of packets may comprise one or more symbols and/or values in a plurality of packets that may be same and/or similar, at least in part, such as, for example, one or more predetermined symbols and/or values in a plurality of packets that may indicate, at least in part, the packets share, at least in part, one or more common properties and/or relationships. In this embodiment, these one or more predetermined symbols and/or values may be defined, at least in part, by a human user, and/or one or more OS and/or VMM processes. For example, in this embodiment, these one or more predetermined symbols and/or values may indicate, at least in part, that the plurality of packets may share, at least in part, common origination, source, destination, and/or intended recipient. Alternatively or additionally, in this embodiment, these one or more predetermined symbols and/or values may indicate, at least in part, that the plurality of packets may have their respective TCP SYN bits set (e.g., for connection initiation), belong at least in part, to the same or similar traffic priority class, and/or comprise management and/or control packets.

The execution of these OS and/or VMM processes also may also result in the loading and execution by one or more host processors 13, one or more processors 12, and/or one or more processor cores 16A . . . 16N of at least one switch control program module (SCPM) 204 in memory 50. At least one module 204 may comprise, for example, one or more program processes. As is described herein, at least one module 204 may generate, at least in part, PPPI 250 in memory 50 that may be used by at least one module 204 and/or switch circuitry 26 for the purpose of facilitating packet processing in host 10. In this embodiment, PPPI 250 may comprise PPPT 200.

For example, in operation, one or more hosts 52 may transmit to host 10 via one or more links 44 packet flow A that comprises a set of one or more (and in this embodiment, a plurality of) packets 30A . . . 30N. Each of the packets transmitted to host 10 from host 52 may comprise respective flow information (FI) that may indicate, at least in part, that packets 30A . . . 30N belong to flow A. For example, as shown in FIG. 1, packet 30A may comprise FI 40. In this embodiment, although not shown in the Figures, packet 30N may comprise respective FI that may be sufficiently identical or similar, at least in part, to FI 40 to permit packet 30N to be determined to belong to flow A. In this embodiment, such FI may comprise one or more of the following: one or more source and/or destination IP and/or medium access control (MAC) addresses, and/or one or more TCP source and/or destination ports, and/or TCP sequence number. Of course, many alternatives and variations are possible without departing from this embodiment. For example, if IP fragmentation occurs and/or is implemented in system 100, FI may be determined by switch circuitry 26 based at least in part upon TCP header information reassembled by switch circuitry 26 from a plurality of fragmented packets.

At host 10, NIC 24 may receive the one or more packets 30A . . . 30N in flow A transmitted from one or more hosts 52 via one or more links 44. After NIC 24 receives each respective packet 30A . . . 30N in the flow A, switch circuitry 26 may examine, at least in part, the respective packet 30A . . . 30N to determine, at least in part, from the respective packet the respective FI comprised in the respective packet, as illustrated by operation 402 in FIG. 4. For example, in the case of packet 30A, switch circuitry 26 may examine, at least in part, packet 30A to determine, at least in part, from packet 30A the respective FI 40 comprised in the packet 30A.

Figure 3:
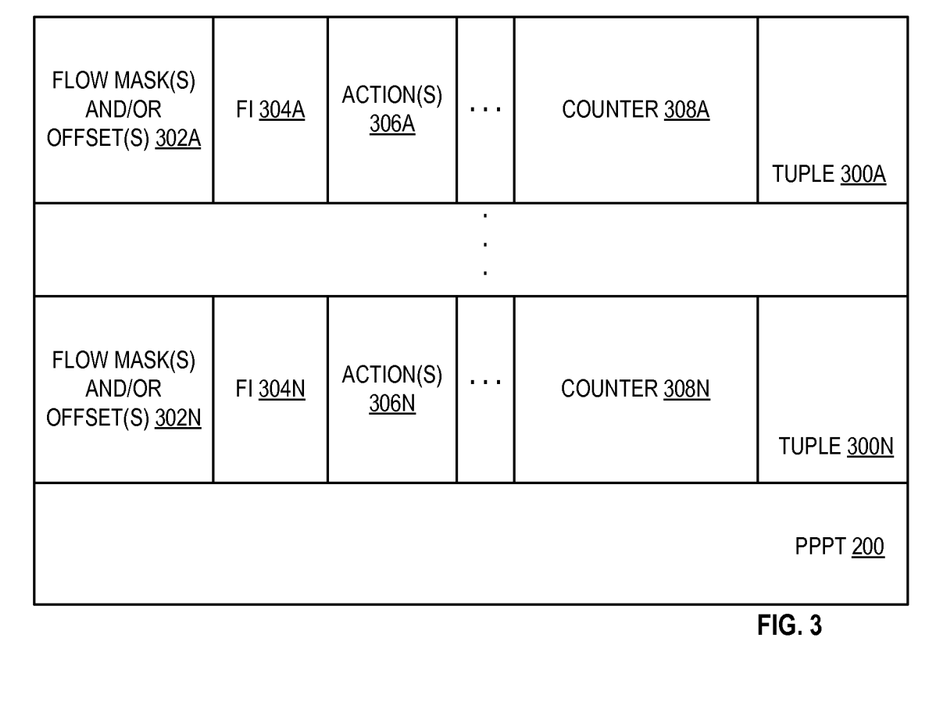
FIG. 3 illustrates a packet processing policy table in an embodiment.
Figure 4:
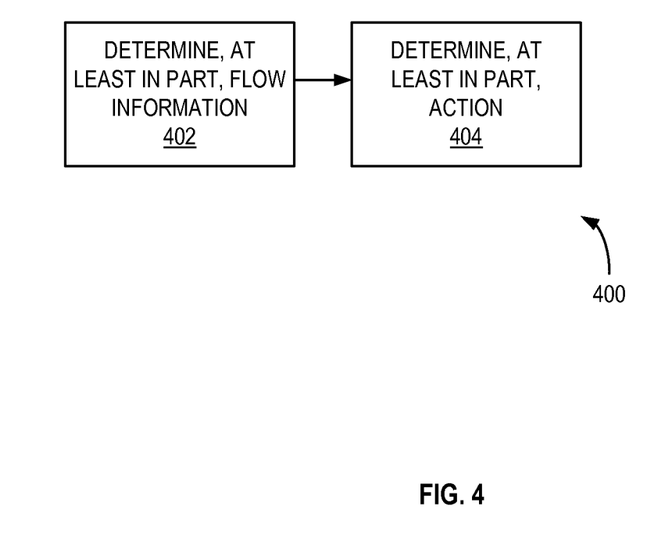
FIG. 4 illustrates operations that may be performed in an embodiment.

After determining, at least in part, the respective FI from, at least in part, a respective packet, switch circuitry 26 may determine, at least in part, an action to be executed involving the respective packet, based at least in part upon the respective FI and PPPI 250, as illustrated by operation 404 in FIG. 4. For example, in the case of packet 30A, after determining, at least in part, respective FI 40 from, at least in part, packet 30A, switch circuitry 26 may examine, as part of operation 404, the respective tuples 300A . . . 300N in PPPT 200 (see FIG. 3) to determine, at least in part, whether at least one module 204 has previously established a packet processing policy that corresponds, at least in part, to the respective FI determined, at least in part, from the respective packet.

In this embodiment, each respective tuple 300A . . . 300N may constitute, comprise, represent, and/or embody, in whole or in part, at least one respective packet processing policy. Each such tuple 300A . . . 300N may include in mutual association respective values that may indicate, represent, and/or identify, at least in part, one or more respective packet bit masks and/or offsets in given packet at which FI associated with a given packet flow is expected to be found, the respective actual FI associated with that given packet flow, one or more respective actions to be taken by the switch circuitry 26 for a packet belong to the given flow, and a counter value indicating the number of packets belonging to the given flow that are presently in a loop-back queue (LBQ) 202 in memory 50. For example, as is shown in FIG. 3, tuple 300A may comprise and/or associate one or more flow mask and/or offset fields 302A, FI 304A, one or more actions 306A, and a counter value 308A. Similarly, tuple 300N may comprise and/or associate one or more flow mask and/or offset fields 302N, FI 304N, one or more actions 306N, and a counter value 308N.

If prior to receiving packet 30A, other packets belonging to flow A have been received by host 10, at least one module 204 may have previously established a packet processing policy for packets belonging to flow A and may have previously stored such policy in PPPT 200 in the form a respective tuple (e.g., tuple 300A) in which the respective FI (e.g., FI 304A) associated with the tuple 300A is the same or similar, at least in part, to FI 40 in packet 30A. If, after examining, at least in part, PPPT 200, switch circuitry 26 determines, at least in part, that at least one tuple 300A has an associated FI 304A that corresponds, at least in part, to the respective FI 40 in the received packet 30A, and at least one action (e.g., at least one action 306A) is associated with the at least one tuple 300A, switch circuitry 26 may determine, at least in part, that at least one module 204 has previously established at least one packet processing policy that corresponds, at least in part, to the FI 40. Thereafter, as part of operation 404, switch circuitry 26 may determine, at least in part, the at least one respective action (e.g., at least one action 306A) associated with the policy embodied by the tuple 300A that the switch circuitry 26 is to take that involves the packet 30A. In this embodiment, the actions that may be associated with the policies embodied by the tuples 300A . . . 300N may include, for example, one or more of the following: dropping (e.g., erasing from and/or overwriting in memory) the respective packet or placing the respective packet in one or more of the VM queues 206A . . . 206N. The specific action or actions associated with a respective tuple may be selected by the at least one module 204 so as to permit implementation of features, such as, filtering of packets in given flows, application targeted routing of packets to VM queues (e.g., so as to route packets to VM queues belonging to VM executing the desired application), flow-based quality of service (e.g., prioritization of packets based upon packet flows and routing of packets to selected VM queues in accordance with such prioritization), Ethernet header based quality of service prioritization, selection of packets for firewall filtering based in whole or in part upon FI contained in the packets themselves, and/or application-layer/content-based load-balancing among VM queues (e.g., to as to balance the packet processing load to VM executing applications best suited to process the packets' contents). After determining, at least in part, the at least one action 306A specified by the packet processing policy embodied by the tuple 300A, switch circuitry 26 may execute that at least one action. For example, if the at least one action 306A comprises placing packet 30A in VM queue 206A, switch circuitry 26 may directly place the packet 30A in, for example, the tail of VM queue 206A, without, for example, copying the packet 30A to one or more queues associated with at least one module 204.

Conversely, if after examining, at least in part, PPPT 200, switch circuitry 26 determines, at least in part, that either no tuple in PPPT 200 is associated with respective FI that corresponds to FI 40 determined, at least in part, from the packet 30A, or if such a tuple exists in the PPPT 200 but no action is yet associated with such tuple in the PPPT 200, switch circuitry 26 may determine, at least in part, that no packet processing policy has been previously established by at least one module 204 that corresponds, at least in part, to FI 40 that corresponds to and/or identifies, at least in part, flow A. In this case, if no such tuple exists in the PPPT 200, switch circuitry 26 may determine, at least in part, that the packet 30A is the first packet in flow A to be received by host 10, and may issue a request to the at least one module 204 that the at least one module 204 establish a new packet processing policy corresponding, at least in part, to the FI 40. Switch circuitry 26 may enter in PPPT 200 a new tuple (e.g., tuple 300A) and may enter the appropriate information in tuple fields 302A and 304A that may correspond, at least in part, to the corresponding FI 40 and flow mask and offsets in packet 30A based upon which FI 40 was determined, at least in part, from packet 30A. In this new tuple 300A, switch circuitry 26 may not provide information for the at least one action 306A. Switch circuitry 26 may place the first packet 30A from new flow A at the tail 208 of LBQ 202, and may set the value of counter 308A in tuple 300A to indicate that a single packet (i.e., packet 30A) from flow A associated with tuple 300A is currently in LBQ 202. Alternatively, without departing from this embodiment, at least one module 204 may enter, at least in part, in PPPT 200 the new tuple 300A and/or may enter, at least in part, the appropriate information in tuple fields 302A and 304A. Further alternatively, all data in PPPT 200 may be entered into PPPT 200 by switch circuitry 26 (e.g., in response at least in part to one or more requests for such entry from at least one module 204.

Conversely, if switch circuitry 26 determines, at least in part, that a tuple (e.g., tuple 300A) already exists in PPPT 200 that is associated with FI 40 (e.g., FI 304A corresponds at least in part to FI 40), but that no action is associated (e.g., in field 306A) in tuple 300A and the counter value indicates that at least one packet having respective FI that corresponds at least in part to FI 40 is already present in LBQ 202, switch circuitry 26 may determine, at least in part, that packet 30A is not the first packet belonging to flow A that has been received by host 10 but that at least one module 204 has not yet established a packet processing policy corresponding, at least in part, to FI 40. In this case, switch circuitry 26 may place packet 30A at the tail 208 of LBQ 202, and may increment the value of counter 308A in tuple 300A to indicate the addition of packet 30A to LBQ 202.

After at least one module 204 receives the request from switch circuitry 26 to establish a new packet processing policy corresponding at least in part to FI 40, at least one module 204 may prompt a human user (not shown) via a not shown user interface comprised in host 10 to specify, at least in part, a new packet processing policy corresponding, at least in part, to FI 40. Alternatively and/or additionally, at least one module 204 may generate, at least in part, such a new policy without input from the human user. In either case, in response, at least in part, to the request from switch circuitry 26, at least one module 204 may determine, at least in part, a new packet processing policy corresponding, at least in part, to FI 40, which policy may include, for example, one or more actions to be taken by switch circuitry 26 involving packets belonging to and/or comprised in flow A identified, at least in part, by FI 40. At least one module 204 may specify these one or more actions as the at least one action 306A in tuple 300A in PPPT 200 by writing into tuple 300A one or more values that may indicate, at least in part, at least one action 306A.

After switch circuitry 26 has placed the packet 30A in LBQ 202 and appropriately set and/or incremented the value of counter 308A, switch circuitry 26 may periodically examine (e.g., in response to a periodic interrupt, timer, and/or counter signal), at least in part, the packet at head of the LBQ 202, and may contemporaneously re-examine the PPPT 200 to determine whether the at least one module 204 has indicated, at least in part, one or more actions in the respective tuple in PPPT 200 corresponding to the FI determined, at least in part, from the packet at the head of the LBQ 202. For example, eventually the position 208 at which packet 30A is placed in LBQ 202 may become the head of LBQ 202. While packet 30A is at the head of LBQ 202, switch circuitry 26 may examine, at least in part, packet 30A at the head of LBQ 202, and also may re-examine the PPPT 200, for the reasons stated above. If after such re-examination, at least in part, of PPPT 200 the switch circuitry 26 determines, at least in part, that at least one module 204 has indicated, at least in part, at least one action 306A in tuple 300A involving packet 30A, switch circuitry 26 may determine, at least in part, that at least one module 204 has established, at least in part, the new packet processing policy corresponding, at least in part, to FI 40. Switch circuitry 26 may remove packet 30A from the LBQ 202, decrement counter 308A to indicate removal of packet 30A from LBQ 202, and may execute the at least one action 306A. As stated above, the at least one action 306A may involve, for example, placing the packet in a VM queue (e.g., VMQ 206A). Advantageously, by using the above-described processing involving LBQ 202 and counter 308A, the correct sequence order (e.g., of receipt by host 10) of packets 30A . . . 30N in flow A may be maintained in further processing of such packets within host 10.

If, however, packet 30A become the head of LBQ 202 but no action has been yet indicated, at least in part, by at least one module 204 as one or more actions 306A, switch circuitry 26 may determine, at least in part, that the at least one module 204 has not yet established, at least in part, a new packet processing policy corresponding, at least in part, to the FI 40. In this case, the switch circuitry 26 may wait until one or more such actions 306A have been indicated, at least in part, by at least one module 204, and after such one more actions 306A have been so indicated, at least in part, switch circuitry 26 may carry out, at least in part, the one or more actions 306A. Alternatively, switch circuitry 26 may attempt to process another packet (not shown) in LBQ 202 for which one or more such actions have been indicated, at least in part, by at least one module 204. Further alternatively, for purposes of performance scaling and/or prevention of head-of-queue blocking issues, at least one module 204 may comprise a plurality of such modules (not shown), LBQ 202 may comprise a plurality of such queues (not shown), and switch circuitry 26 may move packets of new flows to multiple such queues, with each such queue corresponding to and/or being associated with at least one such respective module. In this further alternative arrangement, the manner in which packets are assigned and/or distributed to the plurality of such queues may be determined, at least in part, policy information (not shown, e.g., expressed in one or more not shown lookup tables) stored in, for example, NIC and/or switch circuitry 26. In such arrangement, one or more actions 306A may comprise moving one or more packets of a given flow to one or more such queues, in order to permit, for example, examination and/or analysis of the one or more packets by one or more such modules.

In order to determine, at least in part, the respective FI from, at least in part, packets received by host 10, switch circuitry 26 may parse the packets in accordance with, at least in part, the respective flow mask and offset information 302A . . . 302N that may be already contemporaneously present in the PPPT 200 at time of receipt of the packets by host 10, to retrieve respective FI from the packets. Switch circuitry 26 may compare this respective FI from each respective received packet against the respective FI 304A . . . 304N associated with the respective flow mask and offset information 302A . . . 302N already present in the PPPT 200 to determine, at least in part, in the manner discussed above, whether at least one module 204 has already established packet processing policy that corresponds, at least in part, to the FI from the received packet. Alternatively or additionally, at least one module 204 may specify to switch circuitry 26 and/or switch circuitry 26 may be pre-programmed with one or more predefined and/or default flow masks and/or offsets based upon which, at least in part, switch circuitry 26 may parse and/or retrieve the respective FI from the received packets.

In implementation, in order to improve the efficiency of searching the PPPT 200 by switch circuitry 26 and/or at least one module 204, PPPT 200 may be implemented, at least in part, as an associative array (not shown) which may non-bijectively map a set of not shown keys and a set of not shown values (that each may be of different data types and of arbitrarily selected sizes) to a set of elements in a variable-bit probabilistic content addressable memory (VPCAM, not shown). The VPCAM may be integrated in one or more pipelines of one or more processor cores 16A . . . 16N, or may be part of an offload device coupled to one or more of the processor cores 16A . . . 16N. The elements may comprise respective pairs of hash tags (based on hashing of respective keys) and pointers to respective pairs of keys and values. The hashing function may be selected so as to exhibit a relatively low probability of collision for two different key values. This may have the benefit of reducing the number of memory transactions per searching operation by permitting the tag size to be relatively small, thereby permitting a relatively increased number of key-value pairs to be described. Resolution of a hash collision may be accomplished by comparing the actual key value used in the hashing operation to that contained in respective key-value pairs identified by the pointers in the elements identified by the hash tag. For improved efficiency, each element may have a size that is equal to a single cache line size, or to multiple cache lines. The generation of the elements, keys, pointers, etc. in the associative array may be carried out an associative array offload engine (not shown) comprised in IC 22. Of course, it should be appreciated that the foregoing is merely exemplary and many alternatives, variations, and modifications are possible without departing from this embodiment. For example, PPPT 200 may be eliminated in whole or in part, and/or other and/or additional data structures may be used in system 100 to serve the functions, at least in part, of PPPI 250 and/or PPPT 200, without departing from this embodiment.

Figure 5:
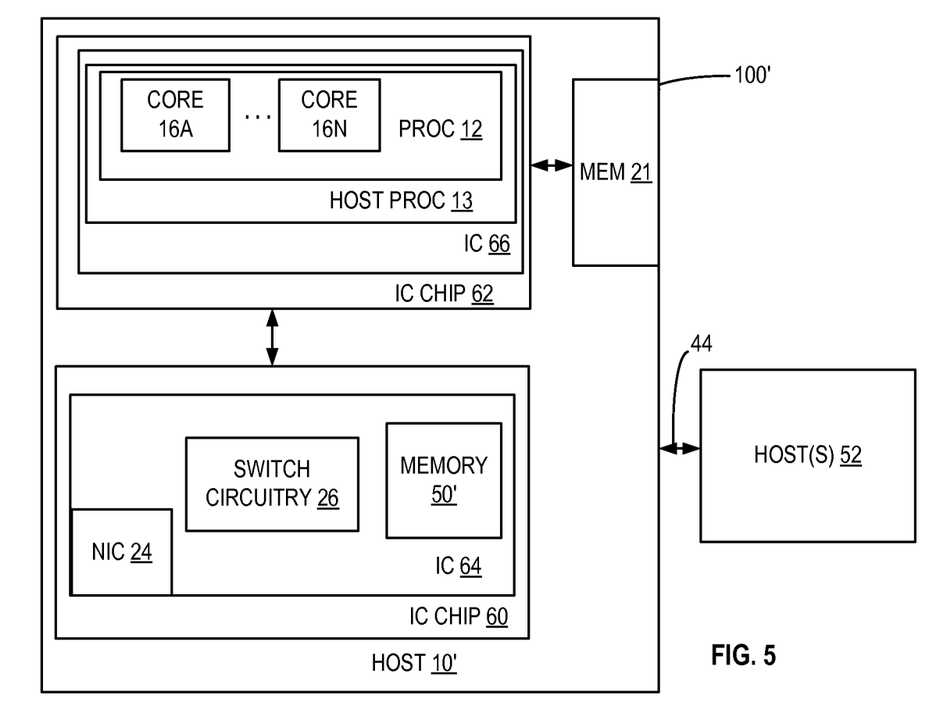
FIG. 5 illustrates another system embodiment.

FIG. 5 illustrates another system embodiment 100'. As shown in FIG. 5, in system 100', host 10' may comprise two IC chips 60 and 62 that may be communicatively coupled to each other. IC chip 60 may comprise IC 64 that may comprise NIC 24, switch circuitry 26, and memory 50'. The function and operation of memory 50' may be the same as or substantially similar to, in whole or in part, the function and operation of memory 50. IC chip 62 may comprise IC 66 that may comprise one or more host processor(s) 13, and may be communicatively coupled to memory 21. One or more host processors 13 may comprise one or more processors 12 that may comprise one or more processor cores 16A . . . 16N. Although not shown in FIG. 5, IC 66 may comprise an MCH whose function and operation may be the same as or substantially similar to, in whole or in part, the function and operation of the MCH that may be comprised in system 100. Also, although not shown in FIG. 5, IC 64 may comprise an IOH whose function and operation may be the same as or substantially similar to, in whole or in part, the function and operation of the IOH that may be comprised in system 100. Alternatively or additionally, memory 50' may be comprised in IC 64 and/or IC 66, without departing from this embodiment.

Thus, in an embodiment, an apparatus is provided that may include an integrated circuit including switch circuitry to determine, at least in part, an action to be executed involving a packet. This determination may be based, at least in part, upon flow information determined, at least in part, from the packet, and packet processing policy information. The circuitry may examine the policy information to determine whether a previously-established packet processing policy has been established that corresponds, at least in part, to the flow information. If the circuitry determines, at least in part, that the policy has not been established and the packet is a first packet in a flow corresponding at least in part to the flow information, the switch circuitry may request that at least one switch control program module establish, at least in part, a new packet processing policy corresponding, at least in part, to the flow information.

Thus, in this embodiment, higher order packet processing/switching decisions (e.g., establishment of packet processing policies) are made by at least one switch control program module, but lower order packet processing/switching decisions (e.g., determination, at least in part, of applicable packet processing policy that has been established by the at least one switch control program module, and/or one or more actions associated therewith) are determined, at least in part, by switching circuitry. Advantageously, this reduces (1) the amount of host processor computation bandwidth consumed, (2) the amount of actuating power being consumed by the host processor, and (3) the amount of heat being generated by the host processor in this embodiment compared to prior conventional technology wherein all of the switching functions are implemented by a software switching mechanism executed by the host processor. Additionally, by permitting such higher order decisions to be made by the at least one switch control program module in this embodiment, it is easier to update, modify, and/or change forwarding algorithms and/or policies in this embodiment compared to prior conventional techniques wherein such algorithms and/or polices are hard-coded. Furthermore, in this embodiment, relatively large content addressable memories and side random access memories may not be utilized. Advantageously, this may reduce the amount of IC real-estate consumed in this embodiment compared to prior conventional technology wherein switches consisting solely of hardware are utilized.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus comprising:
an integrated circuit chip that comprises a network interface controller, the integrated circuit chip also comprising switch circuitry to determine, at least in part, an action to be executed involving a packet, determination of the action being based, at least in part, upon flow information determined, at least in part, from the packet, and packet processing policy information, the switch circuitry being to examine, at least in part, the policy information to determine, at least in part, whether a previously-established packet processing policy has been established that corresponds, at least in part, to the flow information;
if the switch circuitry determines, at least in part, that the previously-established policy has not been established, the switch circuitry is to place the packet in a queue;
after the packet has been placed in the queue, the switch circuitry is to carry out the action after the action has been indicated, at least in part;
the action being selected so as to implement at least one of:
application targeted packet routing to selected virtual machine queues in accordance with packet-flow-based prioritization;
Ethernet header based quality of service prioritization;
application-layer-based load-balancing among the virtual machine queues; and
content-based load balancing among the virtual machine queues.

2. The apparatus of claim 1, wherein:
the packet-flow-based prioritization is packet-flow-based quality of service prioritization.

3. The apparatus of claim 1, wherein:
the application-layer-based load-balancing is implemented so as to balance packet processing load to virtual machines executing applications best suited to process received packets.

4. The apparatus of claim 1, wherein:
the content-based load balancing is implemented so as to balance packet processing load to virtual machines executing applications best suited to process received packets.

5. The apparatus of claim 1, wherein:
the integrated circuit chip also comprises a host processor that comprises a plurality of processor cores.

6. The apparatus of claim 5, wherein:
a host comprises the integrated circuit;
the host comprises the host processor; and
the host processor is to execute at least one control module to establish, at least in part, the previously-established packet processing policy.

7. A method comprising:
determining, at least in part, by switch circuitry, an action to be executed involving a packet, the determining being based, at least in part, upon flow information determined, at least in part, from the packet, and packet processing policy information, the switch circuitry being to examine, at least in part, the policy information to determine, at least in part, whether a previously-established packet processing policy has been established that corresponds, at least in part, to the flow information;
an integrated circuit chip comprising the switch circuitry and a network interface controller;
if the switch circuitry determines, at least in part, that the previously-established policy has not been established, the switch circuitry is to place the packet in a queue;
after the packet has been placed in the queue, the switch circuitry is to carry out the action after the action has been indicated, at least in part;
the action being selected so as to implement at least one of:
application targeted packet routing to selected virtual machine queues in accordance with packet-flow-based prioritization;
Ethernet header based quality of service prioritization;
application-layer-based load-balancing among the virtual machine queues; and
content-based load balancing among the virtual machine queues.

8. The method of claim 7, wherein:
the packet-flow-based prioritization is packet-flow-based quality of service prioritization.

9. The method of claim 7, wherein:
the application-layer-based load-balancing is implemented so as to balance packet processing load to virtual machines executing applications best suited to process received packets.

10. The method of claim 7, wherein:
the content-based load balancing is implemented so as to balance packet processing load to virtual machines executing applications best suited to process received packets.

11. The method of claim 7, wherein:
the integrated circuit chip also comprises a host processor that comprises a plurality of processor cores.

12. The method of claim 11, wherein:
a host comprises the integrated circuit;
the host comprises the host processor; and
the host processor is to execute at least one control module to establish, at least in part, the previously-established packet processing policy.

13. Non-transitory machine-readable memory storing one or more instructions that when executed by a machine result in execution of operations comprising:
determining, at least in part, by switch circuitry, an action to be executed involving a packet, the determining being based, at least in part, upon flow information determined, at least in part, from the packet, and packet processing policy information, the switch circuitry being to examine, at least in part, the policy information to determine, at least in part, whether a previously-established packet processing policy has been established that corresponds, at least in part, to the flow information;
an integrated circuit chip comprising the switch circuitry and a network interface controller;
if the switch circuitry determines, at least in part, that the previously-established policy has not been established, the switch circuitry is to place the packet in a queue;
after the packet has been placed in the queue, the switch circuitry is to carry out the action after the action has been indicated, at least in part;
the action being selected so as to implement at least one of:
application targeted packet routing to selected virtual machine queues in accordance with packet-flow-based prioritization;
Ethernet header based quality of service prioritization;
application-layer-based load-balancing among the virtual machine queues; and
content-based load balancing among the virtual machine queues.

14. The memory of claim 13, wherein:
the packet-flow-based prioritization is packet-flow-based quality of service prioritization.

15. The memory of claim 13, wherein:
the application-layer-based load-balancing is implemented so as to balance packet processing load to virtual machines executing applications best suited to process received packets.

16. The memory of claim 13, wherein:
the content-based load balancing is implemented so as to balance packet processing load to virtual machines executing applications best suited to process received packets.

17. The memory of claim 13, wherein:
the integrated circuit chip also comprises a host processor that comprises a plurality of processor cores.

18. The memory of claim 17, wherein:
a host comprises the integrated circuit;
the host comprises the host processor; and
the host processor is to execute at least one control module to establish, at least in part, the previously-established packet processing policy.

\* \* \* \* \*